(12) United States Patent
Grasso et al.

(10) Patent No.: US 8,206,490 B2
(45) Date of Patent: Jun. 26, 2012

(54) CONTAMINANT SEPARATOR AND ISOLATION LOOP FOR A FUEL REACTANT STREAM FOR A FUEL CELL

(75) Inventors: Albert P. Grasso, Vernon, CT (US); John L. Preston, Jr., Hebron, CT (US); Francis Kocum, Glastonbury, CT (US); Richard J. Assarabowski, Vernon, CT (US); Derek Hildreth, West Hartford, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 553 days.

(21) Appl. No.: 12/310,269

(22) PCT Filed: Sep. 20, 2006

(86) PCT No.: PCT/US2006/036712
§ 371 (c)(1),
(2), (4) Date: Feb. 17, 2009

(87) PCT Pub. No.: WO2008/036090
PCT Pub. Date: Mar. 27, 2008

(65) Prior Publication Data
US 2009/0246573 A1 Oct. 1, 2009

(51) Int. Cl.
*B01D 53/14* (2006.01)
(52) U.S. Cl. ............... 95/196; 95/205; 95/211; 95/232; 95/236; 96/234; 96/242; 429/410
(58) Field of Classification Search ............ 429/17, 429/20, 410; 95/205, 211, 232, 195–196, 95/234, 290, 296–297, 300; 96/234, 240, 96/242, 290, 296–297, 300; 423/224, 228–229
See application file for complete search history.

(56) References Cited

U.S. PATENT DOCUMENTS

| | | | | | |
|---|---|---|---|---|---|
| 3,455,819 | A | * | 7/1969 | Crits | 210/673 |
| 3,920,419 | A | * | 11/1975 | Schroeder et al. | 95/9 |
| 3,961,018 | A | * | 6/1976 | Williamson | 423/228 |
| 4,259,302 | A | * | 3/1981 | Katz et al. | 423/237 |
| 4,307,067 | A | * | 12/1981 | Tagawa et al. | 423/224 |
| 4,370,234 | A | * | 1/1983 | Marsland | 210/617 |
| 4,801,356 | A | * | 1/1989 | Grasso | 203/11 |
| 5,792,572 | A | * | 8/1998 | Foley et al. | 429/423 |
| 6,376,114 | B1 | * | 4/2002 | Bonville et al. | 429/425 |
| 7,628,847 | B2 | * | 12/2009 | Pope et al. | 96/242 |

* cited by examiner

*Primary Examiner* — Duane Smith
*Assistant Examiner* — Ives Wu
(74) *Attorney, Agent, or Firm* — Malcolm J. Chisholm, Jr.

(57) ABSTRACT

A separator scrubber (58) and isolation loop (78) decontaminates a fuel reactant stream of a fuel cell (12). Water passes over surfaces of an ammonia dissolving means (61) within the scrubber (58) while the fuel reactant stream simultaneously passes over the surfaces to remove contaminants from the fuel reactant into the water. An accumulator (68) collects the separated contaminants and water, and an isolation loop pump (84) directs flow of the separated contaminant stream through the isolation loop (78). A heat exchanger (86) and an ion exchange bed (88) modify the heat of, and remove contaminants from, the separated contaminant stream, and the isolation loop (78) directs the decontaminated stream back onto the packed bed (62)-. Separating contaminants from the fuel reactant stream and then isolating and concentrating the separated contaminants within the ion exchange bed (88) minimizes cost and maintenance requirements.

14 Claims, 1 Drawing Sheet

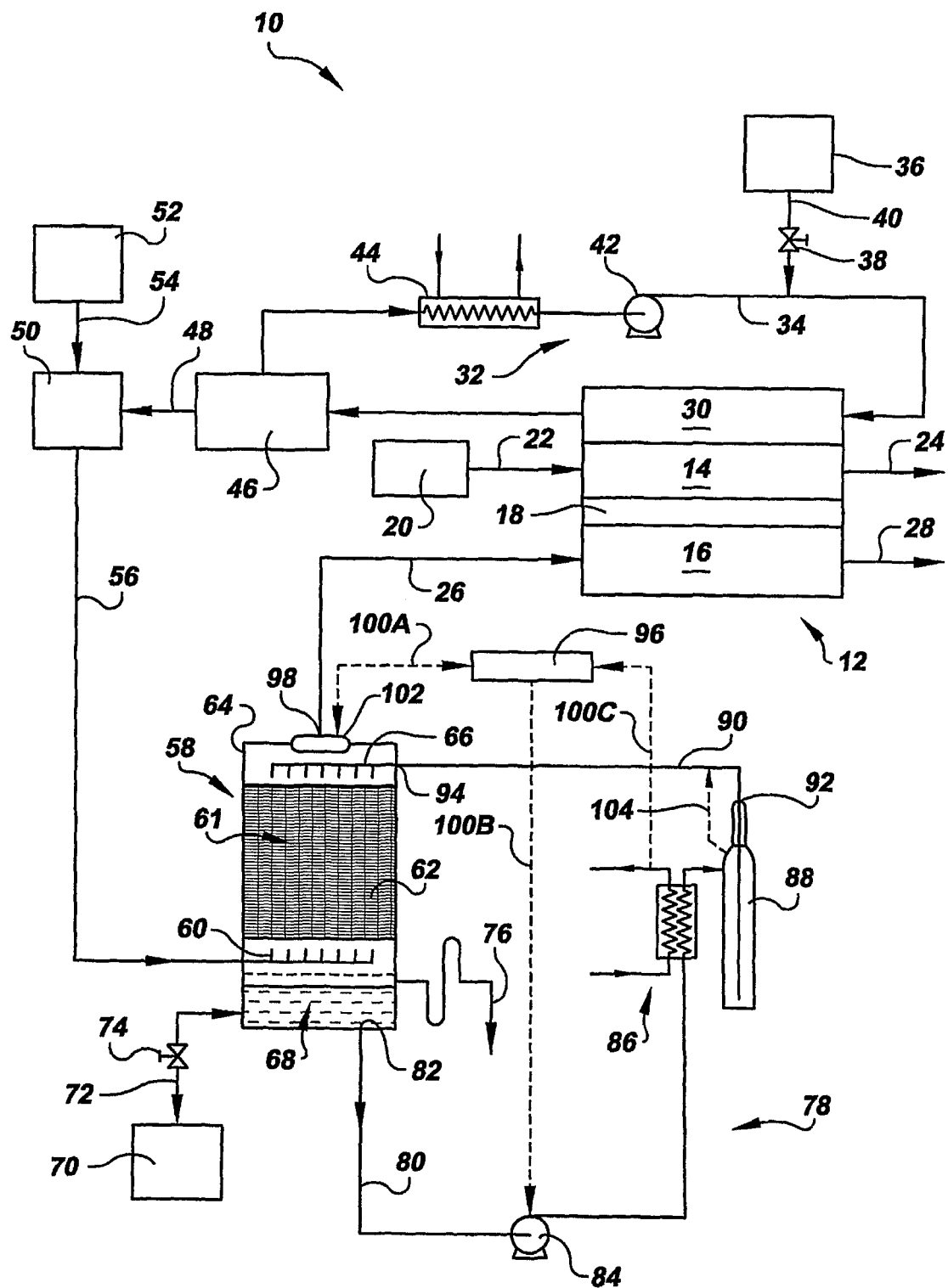

CONTAMINANT SEPARATOR AND ISOLATION LOOP FOR A FUEL REACTANT STREAM FOR A FUEL CELL

TECHNICAL FIELD

The present disclosure relates to fuel cells that are suited for usage in transportation vehicles, portable power plants, or as stationary power plants, and the disclosure especially relates to a contaminant separator and isolation loop for efficiently removing contaminants such as ammonia from a fuel reactant stream passing into a fuel cell.

BACKGROUND ART

Fuel cells are well known and are commonly used to produce electrical current from hydrogen containing reducing fluid fuel and oxygen containing oxidant reactant streams to power electrical apparatus such as transportation vehicles. In fuel cells of the prior art, it is well known that fuel is produced by a reformer and the resulting fuel is referred to as a reformate fuel that flows from the reformer through a fuel reactant stream inlet line into an anode flow field of the fuel cell. As is well known an oxygen rich reactant simultaneously flows through a cathode flow field of the fuel cell to produce electricity. Unfortunately, such reformate fuels frequently contain contaminants especially ammonia. The presence of ammonia in the reformate fuel stream is detrimental to the performance of the fuel cell. It is understood that ammonia is a common byproduct of the reforming process and although the reforming process is designed to minimize formation of ammonia, it is common that low levels of ammonia are present in the reformate fuel. The ammonia formation results from nitrogen that is present in natural gas that is fed into the reformer to be reformed into the fuel. Typically nitrogen content is between 2-3 percent but may reach as high as 15 percent in some parts of the world. Known fuel cells that include phosphoric acid as an electrolyte cannot achieve a desired 10 year life with greater than 1-2 percent nitrogen within the natural gas. Additionally, in the case of auto thermal or partial oxidation reformers, nitrogen can also be introduced when air is used as the oxygen source for the reforming process.

Many efforts have been undertaken to remove ammonia and other contaminants from fuel reactant streams of fuel cells. For example, U.S. Pat. No. 4,801,356 that issued on Jan. 31, 1989, to Grasso disclosed an elaborate system for removal of ammonia from fuel cell power plant water. The system of Grasso includes passing cooling water that had been used to cool the reformate fuel through a first steam stripper and a second steam stripper to remove the ammonia contaminant. Although effective, the system of Grasso requires complex and costly strippers and processing of a large volume of fuel cell coolant water.

More recently U.S. Pat. No. 6,376,114, that issued on Apr. 23, 2002 to Bonville, Jr. et al., disclosed another elaborate system for removing ammonia and other contaminants from reformate fuel. The system of Bonville, Jr. et al., includes alternatively a disposable ammonia scrubber, an ammonia scrubbing cool water bed and an ammonia stripping warm water bed, a pair of first and second regenerable scrubbers, or a single regenerable scrubber. Again, while effective the Bonville, Jr. et al system includes elaborate and costly components that require a high level of maintenance to operate the system. Other ammonia and related contaminant removal systems for fuel cells are known in the art. However, none of these provide for efficiently removing ammonia with minimal costs and minimal maintenance requirements. Most known ammonia contaminant removal systems require large components for processing a high volume of fluids, or require high frequency removal and replacement of contaminated filters and/or ion beds, etc.

Consequently, there is a need for a contaminant removal system for a fuel reactant stream that may be operated efficiently for a long periods of time without high frequency maintenance.

SUMMARY

The disclosure is a contaminant separator and isolation loop for a fuel reactant stream of a fuel cell. The separator is a separator scrubber secured in fluid communication with a fuel reactant inlet line of the fuel cell. The separator scrubber includes a packed bed of high surface area medium disbursed within a scrubber container. A water discharge is secured above the packed bed for discharging water to flow by gravity over the surface area of the medium. A fuel reactant discharge is secured below the packed bed for discharging the fuel reactant to flow upward from the fuel reactant discharge through the packed bed. An accumulator is secured in fluid communication with the packed bed for accumulating water below the packed bed, and the accumulator may consist of simply a water accumulation area in the scrubber container below the packed bed and fuel reactant discharge. A scrubber fuel outlet is defined within the scrubber container for directing the fuel reactant stream to flow from the scrubber container back into the fuel reactant inlet line.

An isolation loop is secured in fluid communication with the separator scrubber, and the isolation loop includes a loop conduit for directing a separated contaminant stream out of the accumulator of the separator scrubber and eventually back into the separator scrubber. An isolation loop pump is secured in fluid communication with the loop conduit for pumping the separated contaminant stream through the loop conduit. A heat exchanger is secured in heat exchange relationship with the loop conduit for heating or removing heat from the separated contaminant stream within the loop conduit. An ion exchange bed is secured in fluid communication with the loop conduit for directing flow of the separated contaminant stream through the ion exchange bed and for removing the contaminants from the separated contaminant stream. A loop conduit return line is secured in fluid communication between an outlet of the ion exchange bed and a water inlet of the separator scrubber for directing flow of the de-contaminated stream from the ion exchange bed back into the separator scrubber to be discharged through the water discharge over the packed bed.

In a preferred embodiment the contaminant separator and isolation loop may also include a carbon dioxide vent bypass line secured between the ion exchange bed and the loop conduit return line for directing flow of carbon dioxide, hydrogen gas and other gaseous bubbles from the ion exchange bed back into the water stream within the loop conduit flowing back into the separator scrubber. In another preferred embodiment a controller may sense the temperature and/or moisture content of the fuel reactant stream leaving the separator scrubber to control the heat exchanger and isolation loop pump to achieve optimal temperatures of the water cycling through the isolation loop to thereby control both or either of the temperature and moisture content of the fuel reactant stream leaving the separator scrubber and passing into the fuel cell. The isolation loop pump and heat exchanger may be controlled and/or set to achieve a balance between the heat transfer from the fuel reactant stream to the water within the separator scrubber and a desired level of ammonia removal from the fuel reactant stream. Ammonia removal also depends upon the solubility of the ammonia in the water. Therefore, the temperature of the water passing through the separator scrubber may be controlled to facilitate achieving optimal ammonia removal and optimal heat transfer from the hot fuel passing from the reformer through the separator scrubber and into the fuel cell.

By first separating the ammonia from the fuel stream within the separator scrubber into the liquid water within the scrubber and then cycling the separated contaminant stream through the isolation loop, the present disclosure provides that only ammonia is removed from the separated contaminant stream so that only a relatively small amount of ion exchange material is required. An appropriate size of the ion exchange bed may therefore be established, based upon the known ammonia concentration within the fuel supply to the reformer, so that the ion exchange bed is only replaced at desired, pre-determined time intervals. For example, if it is known that the fuel to be supplied to the reformer has a known concentration of nitrogen and the fuel cell has a desired operating maintenance schedule of only replacing an ion exchange bed once per year, then the ion exchange bed can be sized or dimensioned to filter the concentrated ammonia from the cycling water within the isolation loop so that the ion exchange bed has to be replaced only at yearly intervals.

To achieve such performance with de-contamination systems of the prior art, either a much larger, more costly and more complicated scrubber and/or ion exchange bed would be required or replacement of an ion exchange bed or other contaminant isolation apparatus would be required at much more frequent intervals. The present disclosure isolates the contaminants within an isolation loop that is separated from all other power plant water systems, such as a fuel reformer system, so that only ammonia has to be removed from the water. Therefore, the contaminant separator and isolation loop of the present disclosure achieve extremely efficient removal of contaminants within the fuel cell fuel reactant stream and also achieves maintenance of optimal temperature and moisture content of the fuel reactant stream.

Accordingly, it is a general purpose of the present disclosure to provide a contaminant separator and isolation loop for a fuel reactant stream of a fuel cell that overcomes deficiencies of the prior art.

It is a more specific purpose to provide a contaminant separator and isolation loop for a fuel reactant stream of a fuel cell that enhances removal of contaminants from, and maintenance of an optimal temperature and moisture content of, a fuel reactant stream of a fuel cell.

These and other purposes and advantages of the present contaminant separator and isolation loop for a fuel reactant stream of a fuel cell will become more readily apparent when the following description is read in conjunction with the accompanying drawing.

BRIEF DESCRIPTION OF DRAWING

FIG. 1 is a simplified schematic representation of a fuel cell having a contaminant separator and isolation loop for a fuel reactant stream of a fuel cell constructed in accordance with the present disclosure.

DESCRIPTION OF THE PREFERRED EMBODIMENTS

Referring to the drawings in detail, a fuel cell having a contaminant separator and isolation loop for a fuel reactant stream is shown in FIG. 1, and is generally designated by the reference numeral 10. A fuel cell 12 appropriate for the present disclosure includes a cathode flow field 14 and an anode flow field 16 secured to apposed sides of an electrolyte 18. The electrolyte 18 may be a phosphoric acid electrolyte, a proton exchange membrane ("PEM") electrolyte, or any electrolyte known in the art. An oxygen supply 20 delivers an oxygen containing reactant stream through an oxidant inlet 22 into and through the cathode flow field 14, and the oxygen reactant stream leaves the fuel cell 12 through a cathode vent 24. A hydrogen containing reducing fluid fuel is directed to flow through a fuel reactant inlet line 26 through the anode flow field 16 and out of the fuel cell 12 through anode vent 28.

The fuel cell 12 also includes a coolant plate 30 that has a water-based coolant circulating through the plate 30 by a way of a coolant loop 32. The coolant loop includes a coolant loop conduit 34 that directs the coolant through the coolant loop 32. A coolant supply 36 selectively directs the coolant through a coolant inlet valve 38 and coolant inlet line 40 into the coolant loop conduit 34. A coolant pump 42 is secured in fluid communication with the coolant loop conduit 34 for pumping the coolant through the coolant loop 32. A coolant loop heat exchanger 44 is secured in heat exchange relationship with the coolant loop conduit 34 to control a temperature of the coolant cycling through the coolant loop 34. A steam separator 46 is secured in fluid communication with the coolant loop conduit 34 for separating steam from liquid coolant within the coolant loop conduit 34.

Steam is directed from the steam separator 46 through a steam line 48 into a reformer means 50 for reforming a hydrogen rich fuel, such as natural gas, into a reformate fuel such as hydrogen gas. A hydrogen containing fuel supply 52 directs the fuel through a fuel line 54 into the reformer 50. The fuel supply 52 may be a pressurized supply source, or may include pressurizing means for increasing a pressure of the fuel in a manner known in the art. The reformer 50 may be any reformer means known in the art for reforming hydrogen rich fluids into reformate fuels appropriate for use in fuel cells. The reformer means also includes related components necessary for processing the hydrogen rich fuel into a reformate fuel appropriate for a fuel cell, such as de-sulfurizers, shift converters, etc.

The reformate fuel leaves the reformer 50 and related components through a first section 56 of the fuel reactant inlet line 26. The fuel then is directed into a separator scrubber 58 to be discharged through a fuel reactant discharge 60 within the scrubber 58. The separator scrubber 58 includes an ammonia dissolving means 61 for dissolving ammonia from the reformate fuel into a liquid separated contaminant stream within the separator scrubber 58, such as a packed bed 62 of a high surface area medium disposed within a scrubber container 64. Alternative ammonia dissolving structures 61 that may be utilized include open cell foams, unitary integral ceramic foam, honey-comb materials, corrugated materials, wool, or wire-mesh structures. A water discharge 66 is secured above the packed bed 62 for discharging water from the discharge 66 to pass downward by gravity through the packed bed 62. The fuel discharge 60 is secured below the packed bed so that the fuel discharged through the discharge 60 passes upward through the packed bed as the water is flowing downward through the packed bed 62. As the gaseous fuel passes over and contacts the surface area of the packed bed 62 contaminants within the gaseous fuel are dissolved into solution within the water passing over the surface of the medium within the packed bed 62. Flow through the above described packed bed 62 of the separator scrubber 58 has been described with the flow of the water being downward by force of gravity and the flow of the gaseous fuel being upward, counter to the water flow ("counter-flow"). However, it is to be understood that other configurations of the scrubber 58 within the scope of the disclosure may provide for alternative flow patterns, wherein the water and fuel flow across each other ("cross-flow") and/or in parallel ("co-flow") with each other.

An accumulator 68 is defined within the scrubber container 64 such as below the fuel reactant discharge 60 so that water passing downward through the packed bed is accumulated within the accumulator 68. It is to be understood however, that the accumulator 68 may also be a separate container (not shown) secured in fluid communication with the water within the scrubber container 64. A supply of fresh water 70 may be secured in fluid communication with the scrubber container 64 to direct water through a water inlet line 72 and water inlet valve 74 into the scrubber container 64 upon start up or to supplement the scrubber 58 with additional water during operation if a water balance is not maintained. An overflow vent 76 may also be secured to the scrubber container 64 for directing excess water out of the scrubber 58.

An isolation loop 78 is secured in fluid communication with the separator scrubber 58 by way of a loop conduit 80. The loop conduit 80 is secured to a water outlet 82 defined within the scrubber container 64 and in fluid communication with the water within the accumulator 68. The isolation loop 78 also includes a an isolation loop pump means 84 for pumping a stream of water and separated contaminants out of the separator scrubber 58 and through the loop 78. An isolation loop heat exchanger 86 is secured in heat exchange relationship with the loop conduit 80. The heat exchanger 86 may be used for heating or cooling the separated contaminant stream within the loop conduit 80. The isolation loop heat exchanger 86 may be configured and/or operated to transfer thermal energy with the separated contaminant stream to thereby maintain an optimal temperature of the water passing through the isolation loop 78 to thereby produce a desired temperature and relative humidity of the reactant fuel stream passing through and leaving the scrubber separator 58. The isolation loop 78 also includes an ion exchange bed 88 secured in fluid communication with the loop conduit 80 for directing flow of the separated contaminant stream through the ion exchange bed 88 and for removing separated contaminants from the water in the contaminant stream within the bed 88. The isolation loop 78 also includes a loop conduit return line 90 secured in fluid communication between an outlet 92 of the ion exchange bed and a water inlet 94 of the separator scrubber 58 for returning decontaminated water from the isolation loop 78 back into the separator scrubber 58 through the water discharge 66. The ion exchange bed 88 may be any ion exchange means known in the art for removing contaminants from liquid streams, such as a bed including a cation exchange resin, and more specifically a hydrogen form cation exchange bed would be preferred from removal of ammonia.

The separator scrubber 58 and isolation loop 78 may also include a controller means 96 for sensing information such as a temperature and/or a moisture content of the fuel reactant stream leaving the scrubber 58 at a scrubber fuel outlet 98. The controller means 96 may be designed for sensing such temperature, water level, and/or moisture information and communicating that information by way of communication lines, such as electric wires, radio transmissions, optical fibers or any signal communication means capable of achieving those functions, such as microprocessors, computers and the like. The sensed information may be utilized by the controller 96 to control the isolation loop pump 84 and/or the isolation loop heat exchanger 86, through such communication lines (represented in FIG. 1 by hatched lines 100A, 100B, and 100C). Such controller means 96 may include computers as well as electromechanical switches and/or manual control of the pump 84 and/or heat exchanger 86 in response to observed temperature, water level, and/or moisture information at the scrubber fuel outlet 98. It is known that the solubility of ammonia in water increases with decreasing water temperatures. Therefore, the controller means 96 may be used to adjust the temperature of the water being discharged through the water discharge 66 to adjust the amount of ammonia dissolved into the water, thereby increasing or decreasing the decontamination of the fuel reactant stream. The scrubber 58 may also include a mist eliminator 102 adjacent the scrubber fuel outlet 98 for eliminating movement of any water droplets along with the fuel reactant stream. The mist eliminator 102 may be any mist eliminator for achieving such a function, such as steel-wool, etc. As shown in FIG. 1, the scrubber separator 58 is configured so that the scrubber fuel outlet 98 is positioned above the ammonia dissolving means 61 and the fuel discharge 98 is positioned below the ammonia dissolving means 61. Therefore, the scrubber fuel outlet 98 directs flow of the fuel reactant stream out of the scrubber separator 58 after it has passed through the ammonia dissolving means 61.

In another alternate embodiment the isolation loop 78 may contain a carbon dioxide vent bypass line 104 configured to vent carbon dioxide and any other gas bubbles out of the ion exchange bed 88. It is desirable to have a predetermined level of carbon dioxide in the water and separated contaminant stream cycling through the isolation loop 78. However, carbon dioxide and other gaseous bubbles can form from the soluble gases in solution by miscellaneous causes, such as low pressure within an isolation loop pump 84 inlet. Additionally, when ammonia dissolves in water within the loop conduit it becomes bound to dissolved carbon dioxide to form an ionic solution of bicarbonate. This increases the solubility of ammonia and carbon dioxide. When ammonia is removed, such as by the ion exchange bed 88, the previously bound carbon dioxide is released as gaseous carbon dioxide. These bubbles will be trapped within the ion exchange bed 88 due to a liquid downward flow direction. As is well known by persons skilled in the ion exchange field, gas accumulation within water within an ion exchange vessel interferes with performance of the ion exchange bed 88. The carbon dioxide vent bypass line 104 may be configured and utilized to vent the carbon dioxide and other gaseous bubbles out of the stream of separated contaminant and water through the bypass line 104, thereby sending the carbon dioxide and other gaseous bubbles back into the isolation loop conduit return line 90 or out of the isolation loop 78.

The packed bed 62 may contain any high surface area medium for use in scrubbers for removing contaminants by way of flow of liquid over the surface area of the medium. Examples of such high surface area media that may be used in the packed bed include pall rings, raschig rings, berl saddles, etc. which can be made from metal or ceramic materials.

The separator scrubber 58 and isolation loop 78 are shown in FIG. 1 as down-stream, between the reformer means and the anode flow field secured to the fuel reactant inlet line 26. It is pointed out however, that the separator scrubber 58 and isolation loop 78 may also be positioned anywhere between a component of the reformer means that generates ammonia or any contaminant and the anode flow field so that some components, such as a low temperature shift converter (not shown), may be secured between the scrubber 58 and the anode flow field, depending upon a variety of specific factors for a particular fuel cell 12.

By first separating the ammonia or other contaminants within the separator scrubber 58 from the fuel reactant stream within the inlet line 26, and then constantly cycling the separated contaminant stream through the isolation loop to isolate contaminants within the ion exchange bed 88, the present disclosure achieves substantial efficiencies over known art. As recited above, maintenance intervals for replacement of the ion exchange bed 88 or service thereof to remove contaminants within the bed 88, may be extended for substantial durations to minimize maintenance costs. In particular, where the ammonia contamination level of a fuel source is known, the ion bed 88 may be selected to have a contaminant removal capacity such that the bed 88 may only have to be removed or serviced at a predetermined interval, such as once per year. Additionally, because the contaminant removal process of the present disclosure is essentially a two-step process including first separating out the contaminants from the fuel reactant stream within the scrubber 58 and then isolating and concentrating them within the ion exchange bed 88 through a circulating separated contaminant stream, the interruption in the flow of the fuel through the packed bed 62 provides only a very modest pressure drop. Because there is such a modest pressure drop, the costs and complexities of delivering the fuel from the fuel supply 52 through the fuel cell 12 are minimized.

The contaminant separator and isolation loop 10 of the present disclosure also include the method of decontaminating a fuel reactant stream for the fuel cell 12. The method includes the steps of first flowing the fuel reactant stream adjacent surfaces of a packed bed 62 within a scrubber 58 while simultaneously flowing water over the surfaces of the packed bed 62 to separate contaminants from the fuel reactant stream into the water; then accumulating the contaminated water that has flowed over the packed bed within an accumulator 68; and then circulating the water and contaminants as a contaminated stream through an isolation loop 78 from a water outlet 82 of the scrubber; then, modifying a temperature of the contaminated stream within an isolation loop heat exchanger 86; and then removing the contaminants from the contaminated stream within an isolation loop ion exchange bed 88; and then circulating the decontaminated stream back through the isolation loop 78 into a water discharge 66 within the scrubber 58 to flow over the surface areas of the packed bed 62. An additional and optional step may include adding an ammonia solubility enhancing reagent to the separated contaminant stream before the step of removing contaminants from the separated contaminant stream within the isolation loop ion exchange bed 88 step. Any reagents that enhance ammonia solubility and that are compatible with the described contaminant separator and isolation loop 10 would be appropriate, such as an appropriate concentration of phosphoric acid.

In an alternative embodiment, the contaminant separator 58 and isolation loop 78 of the present disclosure may be utilized to remove contaminants from the fuel flowing out of the reformer means 50 for reforming a hydrogen containing fuel into the fuel reactant stream, wherein the fuel reactant inlet line (26) directs the fuel to an alternative hydrogen consuming apparatus (not shown), such as an engine, furnace, etc. In such an embodiment, the disclosure 10 includes the fuel reformer means 50, the ammonia dissolving means 61, the isolation loop 78 and components associated therewith and described above, and the fuel reactant inlet line 26 is configured to direct the fuel out of the contaminant separator 58 and into an alternative fuel consuming apparatus (not shown).

It can be seen that the contaminant separator and isolation loop 10 for a fuel reactant stream of a fuel cell 12 substantially enhances the efficiencies over known apparatus and methods for removing contaminants from a fuel reactant stream. As recited above, by first separating the contaminants from the reactant stream into the separated contaminated water stream and then isolating and concentrating the contaminants within the ion exchange bed 88 from the circulating contaminated stream within the isolation loop 78, the present disclosure dramatically minimizes the complexities of decontaminating a fuel cell reactant stream. Instead of decontaminating the reactant stream through one large, complex apparatus that must be serviced frequently, the present disclosure permits relatively free flow of the reactant fuel through the scrubber and then concentrates and isolates contaminants within the circulation loop and the ion exchange bed. By cycling a water stream through the isolation loop 78 to be decontaminated and to then pass repeatedly over the packed bed 62, the present disclosure enables an efficient concentration of the isolated contaminants within the ion exchange bed for periodic removal from the bed at predetermined intervals to thereby minimize overall costs and maintenance requirements.

While the present disclosure has been disclosed with respect to the described and illustrated contaminant separator and isolation loop 10, it is to be understood the disclosure is not to be limited to those alternatives and described embodiments. For example, while an electrolyte 18 having phosphoric acid is known to be detrimentally affected by ammonia contamination and is therefore a likely form of fuel cell 12 to benefit from this disclosure, the disclosure also will be of substantial advantage to and appropriate for fuel cells with other known electrolytes. Accordingly, reference should be made primarily to the following claims rather than the forgoing description to determine the scope of the disclosure.

What is claimed is:

1. A contaminant separator and isolation loop (10) for a fuel reactant stream of a fuel cell (12), comprising:
    a. a separator scrubber (58) secured in fluid communication with a fuel reactant inlet line (26) of the fuel cell (12), the separator scrubber (58) including an ammonia dissolving means (61) disposed within a scrubber container (64) of the separator scrubber (58) for dissolving ammonia from the fuel reactant stream into a liquid separated contaminant stream within the separator scrubber (58); a water discharge (66) secured adjacent the ammonia dissolving means (61) and configured to discharge water to flow through the ammonia dissolving means (61); a fuel reactant discharge (60) secured adjacent the ammonia dissolving means (61) and configured to discharge the fuel reactant to flow through the ammonia dissolving means (61); an accumulator (68) secured in fluid communication with the ammonia dissolving means (61); a scrubber fuel outlet (98) secured within the scrubber container (64) and configured to direct flow of the fuel reactant from the ammonia dissolving means (61) and from the scrubber separator (58) back into the fuel reactant inlet line (26);
    b. an isolation loop (78) secured in fluid communication with the separator scrubber (58), the isolation loop (78) including a loop conduit (80) configured to direct a separated contaminant stream out of the accumulator (68); an isolation loop pump means (84) secured in fluid communication with the loop conduit (80) for pumping the separated contaminant stream through the loop conduit (80); an isolation loop heat exchanger (86) secured in heat exchange relationship with the loop conduit (80) configured to transfer thermal energy with the separated contaminant stream within the loop conduit (80); an ion exchange bed (88) secured in fluid communication with the loop conduit (80) configured to remove contaminants from the separated contaminant stream within the loop conduit (80); and a loop conduit return line (90) secured in fluid communication between an outlet (92) of the ion exchange bed (88) and the water discharge (66) within the separator scrubber (58) configured to direct flow of the de-contaminated stream from the ion exchange bed (88) back into the separator scrubber (58);

c. an overflow vent (76) secured in fluid communication with the scrubber container (64) configured to selectively direct excess water out of the scrubber (58); and, d. a carbon dioxide vent bypass line (104) secured between an outlet (92) of the ion exchange bed (88) and the loop conduit return line (90) configured to selectively vent carbon dioxide out of the ion exchange bed (88).

2. The contaminant separator and isolation loop (10) for a fuel reactant stream of claim 1, further comprising a mist eliminator (102) secured adjacent the scrubber fuel outlet (98) configured to restrict passage of any water droplets out of the separator scrubber (58) within the fuel reactant stream.

3. The contaminant separator and isolation loop (10) for a fuel reactant stream of claim 1, further comprising a fresh water supply (70) secured in fluid communication with the scrubber container (64) and with a fresh water inlet valve (74) configured to selectively direct the fresh water into the scrubber container (64).

4. The contaminant separator and isolation loop (10) for a fuel reactant stream of claim 1, wherein the ammonia dissolving means (61) comprises a packed bed (62) of a high surface area medium.

5. The contaminant separator and isolation loop (10) for a fuel reactant stream of claim 1, further comprising controller means (96) secured in communication with the fuel reactant stream adjacent the scrubber fuel outlet (98) for sensing information from the fuel reactant stream and for controlling the isolation loop (78) in response to the sensed information.

6. A contaminant separator (58) and isolation loop (78) for removing contaminants from a fuel reactant stream passing within a fuel reactant inlet line (26) from a fuel reformer means (50) for reforming a hydrogen containing fuel into the fuel reactant stream, the contaminant separator (58) and isolation loop (78) comprising:

a. a separator scrubber (58) secured in fluid communication with the fuel reactant inlet line (26), the separator scrubber (58) including an ammonia dissolving means (61) disposed within a scrubber container (64) of the separator scrubber (58) for dissolving ammonia from the fuel reactant stream into a liquid separated contaminant stream within the separator scrubber (58); a water discharge (66) secured adjacent the ammonia dissolving means (61) and configured to discharge water to flow through the ammonia dissolving means (61); a fuel reactant discharge (60) secured adjacent the ammonia dissolving means (61) and configured to direct the fuel reactant stream from the reformer means (50) to flow through the ammonia dissolving means (61); an accumulator (68) secured in fluid communication with the ammonia dissolving means (61); a scrubber fuel outlet (98) secured within the scrubber container (64) and configured to direct flow of the fuel reactant from the ammonia dissolving means (61) and from the scrubber separator (58) back into the fuel reactant inlet line (26);

b. an isolation loop (78) secured in fluid communication with the separator scrubber (58), the isolation loop (78) including a loop conduit (80) configured to direct the separated contaminant stream out of the accumulator (68); an isolation loop pump means (84) secured in fluid communication with the loop conduit (80) for pumping the separated contaminant stream through the loop conduit (80); an isolation loop heat exchanger (86) secured in heat exchange relationship with the loop conduit (80) configured to transfer thermal energy with the separated contaminant stream within the loop conduit (80); an ion exchange bed (88) secured in fluid communication with the loop conduit (80) configured to remove contaminants from the separated contaminant stream within the loop conduit (80); and a loop conduit return line (90) secured in fluid communication between an outlet (92) of the ion exchange bed (88) and the water discharge (66) within the separator scrubber (58) configured to direct flow of the de-contaminated stream from the ion exchange bed (88) back into the separator scrubber (58);

c. a carbon dioxide vent bypass line (104) secured between an outlet (92) of the ion exchange bed (88) and the loop conduit return line (90) configured to selectively vent carbon dioxide out of the ion exchange bed (88).

7. The contaminant separator and isolation loop (10) for a fuel reactant stream of claim 6, further comprising a mist eliminator (102) secured adjacent the scrubber fuel outlet (98) configured to restrict passage of any water droplets out of the separator scrubber (58) within the fuel reactant stream.

8. The contaminant separator and isolation loop (10) for a fuel reactant stream of claim 6, further comprising a fresh water supply (70) secured in fluid communication with the scrubber container (64) and with a fresh water inlet valve (74) configured to selectively direct the fresh water into the scrubber container (64).

9. The contaminant separator and isolation loop (10) for a fuel reactant stream of claim 6, further comprising an overflow vent (76) secured in fluid communication with the scrubber container (64) configured to selectively direct excess water out of the scrubber (as).

10. The contaminant separator and isolation loop (10) for a fuel reactant stream of claim 6, wherein the ammonia dissolving means (61) comprises a packed bed (62) of a high surface area medium.

11. The contaminant separator and isolation loop (10) for a fuel reactant stream of claim 6, further comprising controller means (96) secured in communication with the fuel reactant stream adjacent the scrubber fuel outlet (98) for sensing information from the fuel reactant stream and for controlling the isolation loop (78) in response to the sensed information.

12. A method of decontaminating a fuel reactant stream for a fuel cell (12), comprising the steps of:

a. flowing the fuel reactant stream through an ammonia dissolving means (61) for dissolving ammonia from the fuel reactant stream into a liquid contaminant stream within a separator scrubber (58) while simultaneously flowing water through the ammonia dissolving means (61) to separate contaminants from the fuel reactant stream into the water;

b. accumulating the contaminated water from the packed bed within an accumulator (68);

c. circulating the water and contaminants as a separated contaminant stream from the accumulator (68) through an isolation loop (78);

d. modifying a temperature of the separated contaminant stream within an isolation loop heat exchanger (86);

e. sizing an ion exchange bed (88) of the isolation loop (78) to be replaced at predetermined intervals;

f. removing the contaminants from the contaminated stream within the ion exchange bed (88) of the isolation loop (78); and, g. then, circulating the decontaminated stream from the isolation loop (78) back through the ammonia dissolving means (61).

13. The method of claim 12 comprising the further step of adding an ammonia solubility enhancing reagent to the separated contaminant stream.

14. The method of claim 12 comprising the further step of replacing the ion exchange bed (88) at predetermined time intervals.

* * * * *